(No Model.)

E. M. CHRIST.
DRINKING FOUNTAIN.

No. 568,835. Patented Oct. 6, 1896.

WITNESSES:
C. W. Benjamin
M. G. MacLean

INVENTOR
Edward M. Christ
BY
Earn Deemer & Co.
ATTORNEYS

THE NORRIS PETERS CO., PHOTO-LITHO., WASHINGTON, D. C.

United States Patent Office.

EDWARD M. CHRIST, OF PINE GROVE, PENNSYLVANIA.

DRINKING-FOUNTAIN.

SPECIFICATION forming part of Letters Patent No. 568,835, dated October 6, 1896.

Application filed February 25, 1896. Serial No. 580,703. (No model.)

*To all whom it may concern:*

Be it known that I, EDWARD M. CHRIST, a citizen of the United States, and a resident of Pine Grove, State of Pennsylvania, have invented certain new and useful Improvements in Drinking-Fountains, of which the following is a specification, reference being had to the accompanying drawings, forming a part thereof, in which similar letters of reference indicate corresponding parts.

This invention relates to improvements in drinking-fountains for chickens or other animals, and has for its object to provide an inexpensive and portable article of this character which will be so constructed as to prevent the animals drinking therefrom from wading in the water and fouling the same, a further object being to afford means for supplying a constantly-filled reservoir of fresh water.

The invention will be hereinafter fully described, and specifically set forth in the annexed claim.

Figure 1:
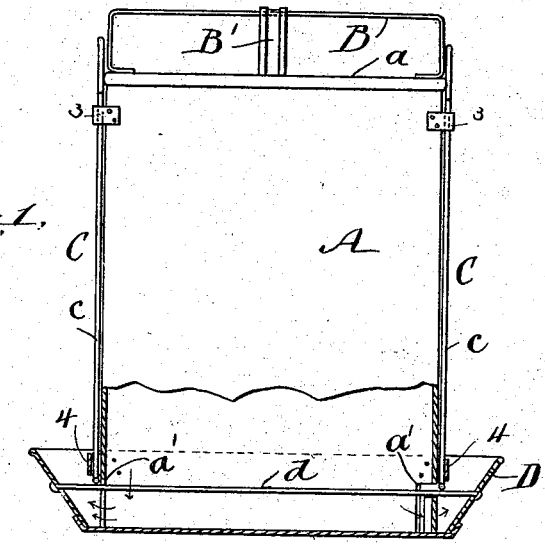
Figure 2:
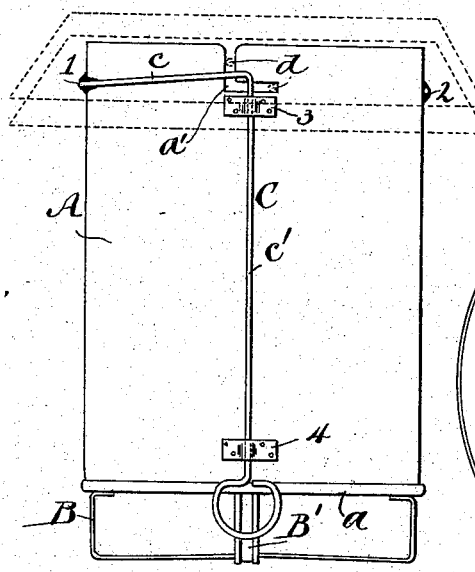
Figure 3:
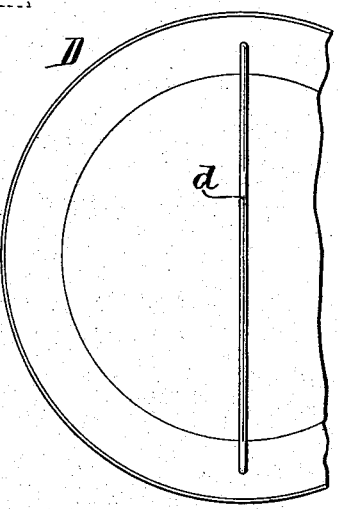

In the accompanying drawings, forming part of this specification, Figure 1 is a side elevation of my improved fountain having its lower portion broken away and shown in section. Fig. 2 is a side elevation showing the device inverted, and Fig. 3 is a plan view of a portion of the device.

In the practice of my invention I provide a cylindrical vessel A, which vessel is closed at one end by a rigidly-attached cover $a$ and is open at the other end.

Through the edge of the annular wall of the vessel and at its open end I provide two L-shaped slots $a'$, which are situated diametrically opposite to each other, and to the lid $a$ of the vessel I attach cross-handles B and B', which said handles act as foot-rests for the reservoir when the same is inverted, as illustrated in Fig. 2 of the drawings.

Normally closing the slots $a'$ are springs C, which comprise segmental portions $c$ and vertical portions $c'$. The segmental portions $c$ are secured to the side of the vessel A at points 1 and 2, and the vertical rod $c'$ of the said springs oscillates within bearings 3 and 4, which bearings are riveted or otherwise attached to the exterior surface of the vessel A.

The device comprises, further, a shallow pan D, which pan has diametrically extended therethrough a rod $d$, which is adapted to engage with the slots $a'$ of the vessel A.

In the operation of the device the vessel A is inverted, as shown in Fig. 2 of the drawings. It is then filled with water up to a line equaling the lower edge of the horizontal portion of the slots $a'$. The pan D is then inverted and forced downwardly until its rod $d$ depresses the springs C and opens communication with the horizontal portions of the slots $a'$. The pan is then revolved until the rod $d$ passes beyond and out of engagement with the springs C, which springs will then resume their normal position and retain the pan D in secure attachment with a vessel or reservoir A. The device then being inverted, water or other fluid contained therein will pass through the slots $a'$ until it reaches a line above the horizontal edges of said slots, when it will stop flowing, owing to the fact that the reservoir A is not supplied with a vent. As the water is consumed by the animals, vent of air will be admitted to the reservoir A through the slots $a'$, and animals can continue drinking until all the water in the said reservoir is exhausted, when the operation of filling, as described above, may be repeated.

Having thus described my invention, what I claim as new, and desire to secure by Letters Patent, is—

The combination of the cylindrical reservoir having L-shaped slots in its open end and springs normally closing said slots and cross-handles upon its closed end; with the shallow pan having a bar running therethrough which engages with the said slots, substantially as shown and described.

In testimony that I claim the foregoing as my invention I have signed my name, in presence of two witnesses, this 20th day of February, 1896.

EDWARD M. CHRIST.

Witnesses:
L. M. FIDLER,
ENOCH SALTIZAHN.